United States Patent
Wei et al.

(10) Patent No.: US 8,065,460 B2
(45) Date of Patent: *Nov. 22, 2011

(54) METHOD OF DETERMINING REQUEST TRANSMISSION PRIORITY SUBJECT TO REQUEST CONTENT AND TRANSMITTING REQUEST SUBJECT TO SUCH REQUEST TRANSMISSION PRIORITY IN APPLICATION OF FIELDBUS COMMUNICATION FRAMEWORK

(75) Inventors: Bo-Er Wei, Taipei (TW); You-Shih Chen, Shing Tien (TW)

(73) Assignee: Moxa Inc., Shing Tien, Taipei Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/766,464

(22) Filed: Apr. 23, 2010

(65) Prior Publication Data

US 2010/0205340 A1 Aug. 12, 2010

Related U.S. Application Data

(63) Continuation-in-part of application No. 11/687,665, filed on Mar. 18, 2007, now Pat. No. 7,743,192.

(51) Int. Cl.
  *G06F 12/00* (2006.01)
  *G06F 13/26* (2006.01)
  *G06F 15/173* (2006.01)

(52) U.S. Cl. ........ 710/244; 710/111; 710/113; 710/119; 710/263; 710/264; 710/310; 709/225; 711/150

(58) Field of Classification Search .......... 710/240–244, 710/260–269
See application file for complete search history.

(56) References Cited

U.S. PATENT DOCUMENTS

| | | | | | |
|---|---|---|---|---|---|
| 5,971,581 | A | * | 10/1999 | Gretta et al. | 700/83 |
| 6,111,888 | A | * | 8/2000 | Green et al. | 370/461 |
| 6,154,800 | A | * | 11/2000 | Anand | 710/107 |
| 6,317,804 | B1 | * | 11/2001 | Levy et al. | 710/305 |
| 6,629,247 | B1 | * | 9/2003 | Hall et al. | 713/300 |
| 6,665,601 | B1 | * | 12/2003 | Nielsen | 701/50 |
| 6,813,767 | B1 | * | 11/2004 | Willke | 718/101 |
| 7,617,346 | B2 | * | 11/2009 | Wang et al. | 710/264 |
| 7,725,635 | B2 | * | 5/2010 | Wei et al. | 710/244 |
| 7,743,192 | B2 | * | 6/2010 | Wei et al. | 710/244 |
| 7,913,016 | B2 | * | 3/2011 | Wei et al. | 710/244 |
| 2007/0142936 | A1 | * | 6/2007 | Denison et al. | 700/29 |
| 2007/0204081 | A1 | * | 8/2007 | Herz | 710/110 |
| 2008/0043766 | A1 | * | 2/2008 | Bryngelson et al. | 370/412 |

OTHER PUBLICATIONS

Samson—Technical Information "Foundation Fieldbus"—retrieved on Dec. 16, 2008, 44 pages.*
Zhou et al, "Periodic Messages and Function Blocks Scheduling in FF System," 2001, 2001 International Conferences on Info-tech and Info-Net, vol. 4, pp. 370-375.*

(Continued)

*Primary Examiner* — Brian Misiura
(74) *Attorney, Agent, or Firm* — Bacon & Thomas, PLLC

(57) ABSTRACT

A method of determining request transmission priority subject to request content and transmitting request subject to such request transmission priority in application of Fieldbus communication framework in which the communication device determines whether the received requests have the priority subject to the respective content, and also determines whether there is any logical operation condition established, and then the communication device transmits the received external requests to the connected slave device as an ordinary request or priority request, preventing the slave device from receiving an important external request sent by the main control end or manager at a late time.

8 Claims, 3 Drawing Sheets

OTHER PUBLICATIONS

Franco, L.R.H.R, "Transmission Scheduling for Fieldbus: a Strategy to Schedule Data and Messages on the Bus with End-to-End Constraints," Nov. 5, 1996, IEEE Internaional Joint Symposia on Intelligence and Systems, pp. 148-155.*

Cavalieri et al, "Scheduling Periodic Information Flow in Fieldbus and Multi-Fieldbus Environments," The International Conference on Automation 1998 Proceeding, 1998, 10 pages.*
CAN Specification Version 2.0, Part A; Date Unknown, 31 pages.*
CAN Specification Version 2.0, Part B; Date Unknown, 38 pages.*

* cited by examiner

METHOD OF DETERMINING REQUEST TRANSMISSION PRIORITY SUBJECT TO REQUEST CONTENT AND TRANSMITTING REQUEST SUBJECT TO SUCH REQUEST TRANSMISSION PRIORITY IN APPLICATION OF FIELDBUS COMMUNICATION FRAMEWORK

This application is a Continuation-In-Part of my patent application Ser. No. 11/687,665, filed on Mar. 18, 2007.

BACKGROUND OF THE INVENTION

1. Field of the Invention

The present invention relates to request transmission methods and more particularly, to a method of determining request transmission priority subject to request content and transmitting request subject to such request transmission priority in application of Fieldbus communication framework, which determines, by means of a communication device, whether the content of each received external request has the priority right, and then transmits every request subject to the priority order, preventing the slave device from receiving an external request from the master device at a late time.

2. Description of the Related Art

Following fast development of communication technology, communication networks have also been well developed. LAN (Local Area Network) and WAN (Wide Area Network) are the original categories of networks categorized subject to their scope and scale. A LAN connects network devices over a relatively short distance. A WAN is a geographically-dispersed collection of LANs. The Internet is the largest WAN, spanning the Earth.

Either in LAN or WAN, Ethernet has proven itself as a relatively inexpensive, reasonably fast, and very popular LAN technology. Ethernet cables (fiber optics or twisted pair) are limited in their reach, and these distances are insufficient to cover medium-sized and large network installations. Therefore, repeaters are used in Ethernets. A repeater in Ethernet networking is a device that allows multiple cables to be joined and greater distances to be spanned. A bridge device can join an Ethernet to another network of a different type, such as a wireless network. Popular types of repeater devices are Ethernet hubs, switches and routers. By means of the combination of Ethernet cables with hubs, switches and/or routers, an Ethernet networking allows transmission or control of data or instructions among different LANs, computers, and/or other devices such as surveillance systems, security systems, automation systems, etc.

Further, there is known a network communication architecture commonly seen in industrial control and device communication protocol or rules, i.e., Fieldbus". Fieldbus is usually used on the industrial network system for real-time distributed control. Its basic configuration is to handle management through a central control unit so that an operator can monitor or program the whole system. The central control unit is typically linked to a middle layer of programmable logic controllers (PLCs) via a bus system. At the bottom of the control chain is the fieldbus which links the PLCs to the components which actually do the work such as sensors, electric motors, switches and contactors. Following alternation of generations, there are now a wide variety of concurring fieldbus standards. Some of the most widely used ones include CAN, EtherCAT, DeviceNet, Modbus, PROFIBUS, SECS and CompuBus.

Further, Fieldbus is a new industrial digital communications network intended to replace the existing 4-20 mA analogue signal standard. The network is a digital, bi-directional, multidrop, serial-bus, communications network used to link isolated field devices, such as controllers, transducers, actuators and sensors. Each field device has low cost computing power installed in it, making each device a "smart" device. Each device will be able to execute simple functions on its own such as diagnostic, control, and maintenance functions as well as providing bi-directional communication capabilities. With these devices not only will the engineer be able to access the field devices, but they are also able to communicate with other field devices for master/slave communication. The major advantage of the Fieldbus that is most attractive to the end user is its reduction in capital costs. The savings attained by the user stem from three main areas, initial savings, maintenance savings, and savings due to improved systems performance. One of the main features of the Fieldbus is its significant reduction in wiring. Only one wire is sufficient to build a Fieldbus system with varying number of devices. The cost of installing field equipment in a Fieldbus system is thus significantly reduced. Installation costs are further reduced due to the fact that the Fieldbus it is a multi-drop rather than point-to-point system and the multidrop network can offer a great reduction in field wiring expense. The fact that the Fieldbus system is less complex than conventional bus systems implies that there will be less overall need for maintenance.

FIG. 3 is a schematic drawing illustrating multiple requests receiving status of a communication gate according to the prior art. Under the Fieldbus architecture, when the master device or communication gateway A received multiple requests, it transmits the requests to the slave device B subject to the order of FIFO (first in first out), i.e., the master device or communication gateway A handles the received requests subject to the order of their received times, but is unable to arrange or transmit the received requests subject to order of their importance level.

Because the master device or communication gate A handles received requests subject to the order of FIFO (first in first out), it may be unable to transmit a request to the slave device B in time. When communication traffic is low, a communication gateway A can always handle all received requests in time. However, when traffic gets higher, gateway A needs much more time to handle received requests in received time order. If there is an important request arrived at this time, the gateway A may unable to transmit it to the slave device B in time since there are too many un-handled requests received before. This could result in many problems. For example, in a regular industrial manufacturing line (such as wafer plant, plastic materials plant), when a request to alter the set values of a slave device B (for example, the revolving speed of a motor) is given to the communication gateway A, an abnormal or interruption of the manufacturing line may occur if the slave device B cannot receive the accurate request in time to execute the request on accurate time, thereby resulting in paralysis or damage of the machinery of the industrial manufacturing line. Further, in a building control, the temperature control, emergency exit system and other control actions need to make an accurate response at the accurate time point. If responding tactics cannot be started at the accurate time point, it will get no help in reducing the probability of occurrence of disaster and the loss resulted from the disaster.

Therefore, it is desirable to provide a method of handling requests according to priority of importance.

SUMMARY OF THE INVENTION

The present invention has been accomplished under the circumstances in view. It is therefore the main object of the present invention to provide a method of determining request transmission priority subject to request content and transmitting request subject to such request transmission priority in application of Fieldbus communication framework.

The present invention determines, by means of a communication device, whether the content of every received external request has the priority right. The determination is done subject the type of request, address of the slave device to receive, address of the register to read/write, or any other individual or combination meaningful fields of the content. After the determination has been done, let the communication gateway/master device transmit every received request subject to the priority order. Therefore, the main control end or manager can send the request to the triggering system or device of an emergency facility, for example, the auto-control system of a building, on time. Because the triggering of a triggering system or device must be executed on time when necessary; therefore, the main control end or manager must send the request to the triggering system or device on time. Sending a triggering request in priority prevents the triggering system or device of the emergency facility from receiving the request at a late time. Therefore, the application of the present invention helps lower the chance of disaster and the loss from any disaster, and also helps evacuation of people from a disaster.

It is another object of the present invention to provide a method of determining request transmission priority subject to request content and transmitting request subject to such request transmission priority in application of Fieldbus communication framework, which uses different determination conditions, such as the number of requests on queue, the switching of an external switch, the value detected by an external device, and etc. to enable the priority right of request which its content corresponds with the required content of the priority request. By means of this method, the user can set the triggering condition of a controlled device in a specific industry or technical field to satisfy different industrial control requirements.

It is still another object of the present invention to provide a method of determining request transmission priority subject to request content and transmitting request subject to such request transmission priority in application of Fieldbus communication framework, which categorizes the priority right into kinds or levels so that different external requests having a same priority level can be categorized into one same group. Thus, any external request that has the highest priority will not be arranged behind an external request that has a second-highest priority, and the user can obtain more right to control the communication gate and will not be constrained by the existing Fieldbus communication protocol.

DETAILED DESCRIPTION OF THE PREFERRED EMBODIMENT

From the aforesaid prior art technique, we know that Fieldbus is a master/slave communication protocol, and the master device or communication gateway under the Fieldbus architecture handles requests subject to the order of FIFO (first in first out). Therefore, all requests are sorting subject to their received times. Normally, in one same Fieldbus network, it is allowed that different slave devices connect to one communication gateway or master device. However, there are many different communication standards compatible to Fieldbus, including CAN, EtherCAT, DeviceNet, Modbus, PROFIBUS, CompuBus and SECS. These communication standards have the common characteristics of shared multi-transmission channel, multi-serial channel, bi-directional and multidrop characteristics. Under Fieldbus communication protocol, the method of determining request transmission priority subject to request content and transmitting request subject to such request transmission priority in application of Fieldbus communication framework, of the present invention is applicable to every of the aforesaid various communication standards that are compatible to Fieldbus communication protocol. The following description uses the term of Fieldbus to substitute for terms of CAN, EtherCAT, DeviceNet, Modbus, PROFIBUS, SECS and CompuBus. Further, the Fieldbus used in the present specification means the protocol applied to automatic control having a master/slave architecture, and a request, response or exception communication mode.

Figure 1:
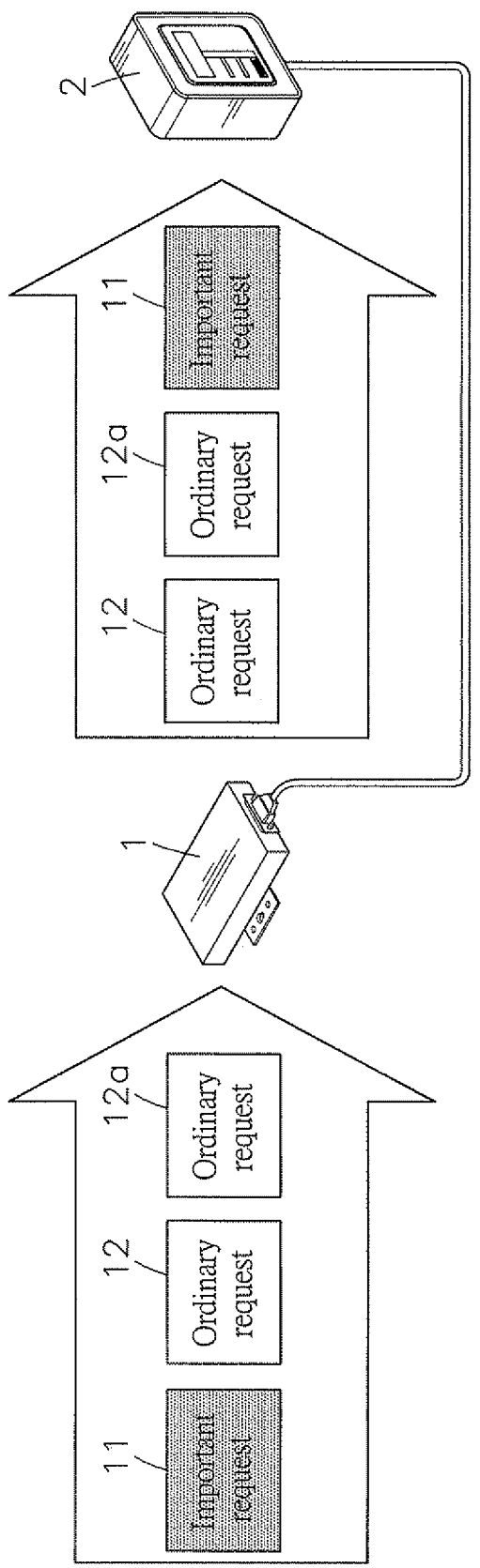
FIG. 1 is a schematic drawing illustrating a communication architecture according to the preferred embodiment of the present invention.

FIG. 1 is a schematic drawing illustrating a communication architecture according to the preferred embodiment of the present invention. As illustrated, when the communication gateway 1 has a slave device 2 connected thereto and when the communication gateway 1 receives from a remote control end multiple control requests (sorting to be an ordinary request 12a, an ordinary request 12, and an important request 11), the communication gateway 1 determines the priority of the instructions or requests subject to their content, so that the slave device 2 can receive the important request 11 prior to the ordinary requests 12 and 12a.

Figure 2:
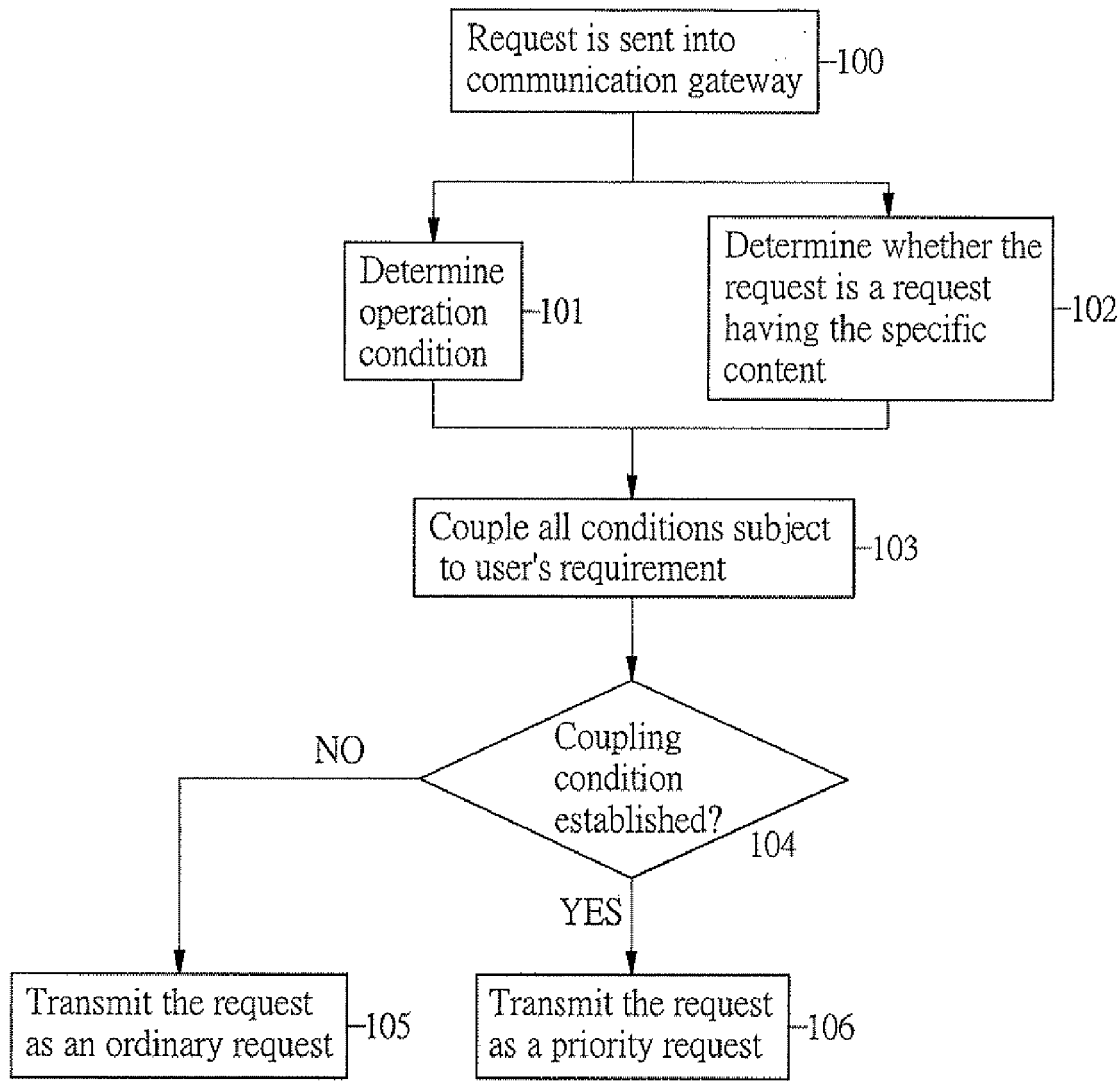
FIG. 2 is a priority determination flowchart according to the present invention.
Figure 3:
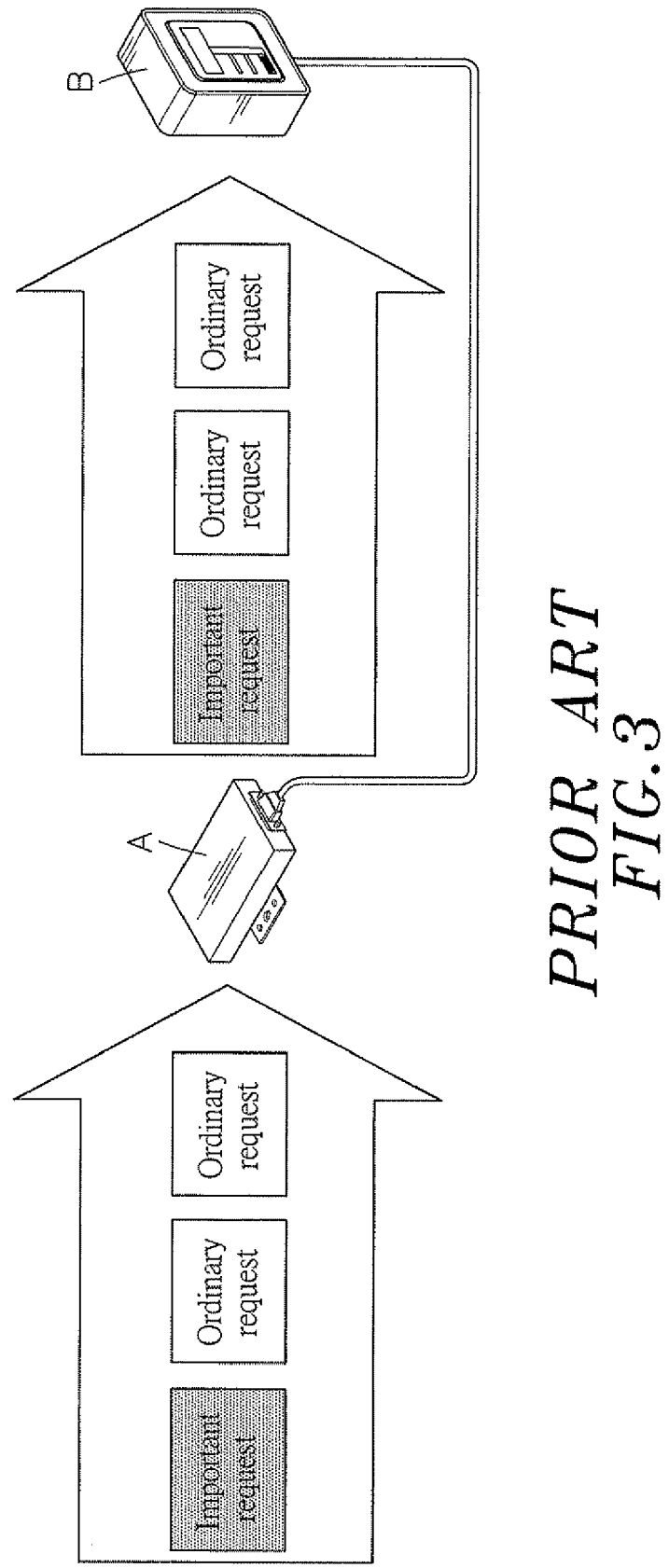
FIG. 3 is a schematic drawing illustrating multiple requests receiving status of a communication gateway according to the prior art.

Referring to FIG. 2 and FIG. 1 again, the determination of priority according to the present invention includes the steps of:

(100) When a request is transmitted to the communication gateway 1, run step (101) and (102);

(101) Determine whether the operation condition are established or not, and then run step (103);

(102) Determine whether the received request has a specific content which corresponds with the required content of the priority request, and then run step (103);

(103) Couple all conditions which includes conditions in step (101) and (102) subject to the user's requirement;

(104) Determine whether the coupling conditions are established or not, and then run step (106) when the coupling conditions are established;

(105) Transmit the request as an ordinary request, and end the procedure;

(106) Transmit the request as a priority request, and then end the procedure.

Briefly speaking, the invention uses two or more methods to determine or couple conditions of external requests and then see whether they are in satisfaction of the conditions required for priority. At first, in step (101), the operation conditions can be the number of requests having the specific content in queue, switching of external switch or any logical operation conditions detected by an external device (such as whether or not in proximity to a predetermined temperature or humidity). These conditions can be used in step (101) as judgment values for AND or OR on logic coupling. Further, in step (102), a request having the specific content can be a specific type of request (for example, a request to read/write the register), the address of a specific destination slave device, the address of a specific register to read/write, or any other specific value of individual or combination meaningful fields of the request. Therefore, based on the aforesaid determination conditions, the communication gateway 1 can determine whether the received external requests have the priority to transmit or not, and can proceed with transmission of requests early. When an external request is determined to be a priority request, the communication gateway 1 can send the request into the queue of higher priority or tag this priority request in the priority position on the original queue, or uses any other method to transmit this request in priority so as to obtain an earlier transmission time prior to the ordinary requests 12 and 12a. Further, during step (100), if the format of the external request is not in conformity with the format under Fieldbus communication architecture or the format of the external request is compatible to Fieldbus communication architecture (for example, Ethernet), the request can be converted into a suitable format during step (105) or step (106) before transmission. Therefore, the external request can be transmitted at the format of its source or after a format conversion.

In actual practice, when too many external requests are received, the communication gateway 1 may be unable to sort the priority of the received external requests. By means of the aforesaid method of using request content, the invention determines the priority of external requests. Therefore, the invention eliminates the problem of being unable to sort external requests when too many external requests are received. Further, the invention categorizes the priority right into kinds or levels so that different external requests having a same priority level can be categorized into one same group. Thus, any external request that has the highest priority will not be arranged behind an external request that has a second-highest priority, and the user can obtain more right to control the communication gateway 1 and will not be constrained by the existing Fieldbus communication protocol.

The method of determining request transmission priority subject to request content and transmitting request subject to such request transmission priority in application of Fieldbus communication framework as described above is simply a preferred embodiment of the present invention. In actual practice, the invention could be implemented on a master device, or a communication device or repeater which is capable to receive external requests. Further, the operation condition to be coupled subject to the user's requirement can be the number of requests having the specific content in queue, switching of an external switch, or the value detected by an external device (for example, specific temperature or humidity).

For example, the technology of the present invention is applicable in the automation control system monitoring. The structure therein comprises a master device capable of transmitting control requests to a communication device 1, and the communication device 1 is capable of transmitting control requests to a field device (slave device 2). In other words, a master device can orderly transmit a plurality of control requests through the communication device 1 to one or a plurality of field devices for monitoring those filed devices. In the preferred embodiment of the present invention, plurality of control requests to the communication device 1, each received control request would be determined as an ordinary request or a priority request by the communication device 1. When the control request is determined as an ordinary request, the control request would be transmitted in the first-in-first-out fashion (first received one would be transmitted first). If the control request is determined as a priority request, the control request would be transmitted in priority, which means the control request would be tagged in priority position of the queue or be transmitted before all queued ordinary requests. Therefore, when the communication device 1 receives the plurality of control requests from the master device in an orderly fashion, the communication device 1 determinate the priority request based on at least one of the content of the request and the logical operational condition of the request, for instance, the priority request should have content includes the specific type of request and the address of the specific register to read/write. When the master device receives a fire alarm signal for overheating in the room from a remote sensor, the master device would transmit a control request of sprinkling water which includes writing a specific value into a specific register of the field device to the communication device 1. It means the content of the received control request includes the type of request as "write" and the address of the register for activating the fire sprinkler. Before the control request is received, there could be a plurality of requests were already queued in the communication device 1 for waiting to be transmitted. If user configures the communication device 1 that the priority request should have content includes the type of request as "write" and the address of the register for activating the fire sprinkler, the control request would be determined as a priority request by the communication device 1. Then, this control request would be transmitted before all queued requests (ordinary ones) or be tagged in priority position of the queue. Therefore, after fire alarm signal is received, the master device could activate the fire sprinkler as soon as possible. In other words, the present invention makes sure the user defined important/urgent requests could always be transmitted to the target field devices as soon as possible.

Certainly, the determination conditions of the priority requests of the communication device 1 can also include both the logical operational condition and the specific content of the requests. The specific content of the requests can also comprise at least one specific type of request (for example, a request to read/write the register), the address of a specific register to read/write. The specific content of the requests can also comprise any other specific value of individual or combination meaningful fields of the request. The above description merely illustrates the preferred embodiment of the present invention, and is not intended to limit the scope of the present invention.

When compared to the prior art technology, the invention has the following advantages:

1. In regular building automation applications, proximal/remote or master/slave concept is adopted. All events management and emergency handling are connected to a computer in the main control room through a transmission interface. When a situation happens, a person in the main control room or the computer issues a request to an external input/output device to execute a specific action, for example, turning on the radiation fan when the temperature is excessively high, turning on the alarm lamp when the exit door is abnormally opened, starting the automatic sprinkling system when the temperature surpasses a predetermined fire temperature, etc. Because the trigging time of these actions is critical, the communication gateway 1 that is in charge of transferring the request must transmits the request in priority. If the communication gateway 1 cannot handle the priority request on time due to reception of a big number of other unimportant requests, the main control end or manager may be unable to start the related emergency facility at the accurate time point. Therefore, by means of determining the priority of each received request subject to its content, the invention prevents the communication gateway 1 from sending out an important request 11 at a late time, enabling the important request 11 to trigger the related facility at the accurate time point, and therefore the invention can lower the chance of disaster and the loss from a disaster, and can also help evacuation of people from a disaster. Therefore, the invention eliminates the problem of being unable to transmit an important request on time as encountered in the prior art technology, which handles all external requests subject to the order of first-in first-out.

2. According to the existing communication protocols under Fieldbus architecture, it is to handle external requests subject to the order of first-in first-out. This request transmission order does not allow transmission of an important request in priority, and may result a system failure. In an industrial manufacturing line (for example, a wafer plant or plastic materials plant), if the communication gateway 1 cannot transmit a control request to the slave device 2 or the slave device 2 cannot execute the request from the communication gateway 1 at the accurate time point, the manufacturing line may be interrupted or an abnormal condition may occur in the manufacturing line, thereby resulting in paralysis or damage of the machinery of the industrial manufacturing line. Therefore, by means of determining whether the external request is a request having the specific content, the communication gateway 1 can transmit every important request to the slave device or operating end on time, preventing a delay of triggering time.

3. By means of different determination conditions, such as the number of requests having the specific content on queue, the switching of an external switch, the value detected by an external device, and etc. to match with an external request having a specific content, the user can set the triggering condition of a controlled device in a specific industry or technical field to satisfy different industrial control requirements, i.e., the user can satisfy different industrial control requirements subject to different situations.

4. Following alternation of generations, Fieldbus communication architecture has become a communication standard in industrial field, and devices in conformity with Fieldbus architecture are intensively used to connect different industrial electronic devices. An industrial application of the method of determining request transmission priority subject to request content and transmitting request subject to such request transmission priority in application of Fieldbus communication framework does not need to add extra physical devices or elements. When matching with the widely applied Fieldbus architecture, the invention can achieve determination of priority right after installation or setting of the software. Therefore, the application of the invention eliminates installation cost of any physical device.

5. The invention uses requests under Fieldbus protocol standards directly, and needs not to define other special requests. Therefore, any request used does not affect normal functioning of the slave device. Further, either using the Fieldbus master device or Fieldbus communication gateway to transmit external requests, the priority right of every request can be calculated through the software. Therefore, the user needs not to worry about the system operational problem that the control end cannot receive the request from the communication gateway on time and that may affect the client's confidence in the reliability of the product, causing the client to reject the product.

6. By means of categorizing priority right into kinds or levels, all external requests have a same priority level can be categorized into one same class. Thus, any external request that has the highest priority will not be arranged behind an external request that has a second-highest priority, and the user can obtain more right to control the communication gateway and will not be constrained by the existing Fieldbus communication protocol.

Although a particular embodiment of the invention has been described in detail for purposes of illustration, various modifications and enhancements may be made without departing from the spirit and scope of the invention.

What the invention claimed is:

1. A method of determining request transmission priority subject to request content and transmitting request subject to such request transmission priority in application of Fieldbus communication framework, comprising the steps of:
    (a) external requests are transmitted from a remote control end to a communication device one after another;
    (b) the communication device determines whether the content of each received request has the priority right;
    (c) the communication device determines whether there is at least one logical operation condition established;
    (d) the communication device couples the logical operation conditions subject to the user's setting and priority condition of the content of each received external request;
    (e) the communication device determines whether each received external request has the priority to transmit;
    (f) the communication device transmits each external requests that does not have the priority to transmit as an ordinary requests; and
    (g) the communication device transmits each external request that has the priority to transmit as a priority request; wherein the logical operation condition includes an on/off switch function triggerable by the user.

2. The method as claimed in claim 1, wherein the priority request transmission procedure is to send the external request into the communication device into a queue having a higher priority.

3. The method as claimed in claim 1, wherein the priority request transmission procedure is to tag the priority request in the priority position on an original queue of the communication device.

4. The method as claimed in claim 1, wherein said communication device categorizes the priority right into different levels or kinds.

5. The method as claimed in claim 1, wherein a determination column of said priority right can include the type of request, an address of the slave device to receive the request, and an address of the register to read/write.

6. The method as claimed in claim 1, wherein said communication device can be a communication gate, a master device or a repeater capable of receiving external requests.

7. The method as claimed in claim 1, wherein if said external request is different from said Fieldbus communication frame, said external request can be converted before transit.

8. The method as claimed in claim 1, wherein the Fieldbus communication framework is one of the framework of CAN, EtherCAT, DeviceNet, Modbus, PROFIBUS, CompuBus and SECS protocols for automated control application that has a master/slave architecture and communication mode of Request, Response or Exception.

* * * * *